United States Patent

Ono et al.

[11] Patent Number: 5,795,970
[45] Date of Patent: Aug. 18, 1998

[54] MIXED DISAZO-DYE COMPOSITION AND BLACK AQUEOUS INK COMPOSITION CONTAINING THE SAME THAT PROVIDES HIGH GRADE IMAGE ON PRINT

[75] Inventors: Takashi Ono; Tatsuya Yagyu; Yoshihiro Sawatari, all of Neyagawa; Masaki Sasaki, Osaka; Miharu Kanaya, Suwa; Hiroko Hayashi, Suwa; Akio Owatari, Suwa; Yasuhiro Ouki, Suwa, all of Japan

[73] Assignees: Orient Chemical Industries, Ltd., Osaka-fu; Seiko Epson Corporation, Tokyo-to, both of Japan

[21] Appl. No.: 701,578

[22] Filed: Aug. 22, 1996

[30] Foreign Application Priority Data

Aug. 25, 1995 [JP] Japan .................. 7-217300

[51] Int. Cl.[6] .................. C09B 67/22; C09D 11/02; B41J 2/01
[52] U.S. Cl. .................. 534/573; 534/727; 534/836; 8/639; 106/31.27; 347/1
[58] Field of Search .................. 534/727, 836, 534/573 M; 8/639; 106/31.27; 347/1

[56] References Cited

U.S. PATENT DOCUMENTS

| | | | |
|---|---|---|---|
| 4,083,840 | 4/1978 | Schoerberger | 534/836 X |
| 5,034,058 | 7/1991 | Akiyama et al. | 534/727 X |
| 5,198,022 | 3/1993 | Aulick et al. | 534/836 X |

FOREIGN PATENT DOCUMENTS

| | | |
|---|---|---|
| 0347803A2 | 12/1989 | European Pat. Off. . |
| 0463737A2 | 1/1992 | European Pat. Off. . |
| 0491993A1 | 7/1992 | European Pat. Off. . |
| 0539178A2 | 4/1993 | European Pat. Off. . |
| 0565286A1 | 10/1993 | European Pat. Off. . |
| 0611811A1 | 8/1994 | European Pat. Off. . |

*Primary Examiner*—Floyd D. Higel
*Attorney, Agent, or Firm*—Birch, Stewart, Kolasch & Birch, LLP

[57] ABSTRACT

A disazo dye composition comprising at least a disazo dye represented by the formula (I) and a disazo dye represented by the formula (II):

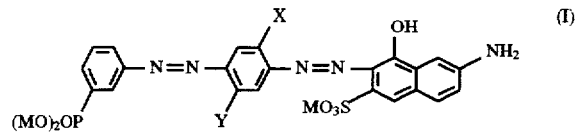

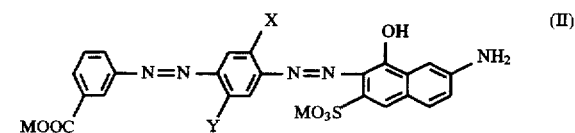

(wherein X and Y indicate an alkoxy group having 1 to 4 carbon atoms, and M indicates hydrogen or a cation selected from the group consisting of, alkaline metal, $NH_4$, alkyl-substituted ammonium, alkanolammonium, morpholinium and piperidinium), wherein, when the disazo dye composition is analyzed by liquid chromatography, the area ratio of the peak area (Sp) of the disazo dye represented by the formula (I) to the peak area (Sc) of the disazo dye represented by the formula (II), that is Sp:Sc is from 1:0.4 to 1:2.4. This disazo dye composition provides a high quality image, rapid ink fixing and the like even on the plain paper.

12 Claims, 8 Drawing Sheets

MIXED DISAZO-DYE COMPOSITION AND BLACK AQUEOUS INK COMPOSITION CONTAINING THE SAME THAT PROVIDES HIGH GRADE IMAGE ON PRINT

FIELD OF THE INVENTION

The present invention relates to a disazo dye composition, a black aqueous ink composition containing the same and a inkjet recording method using the same.

BACKGROUND OF THE INVENTION

The ink used in inkjet recording method is usually obtained by dissolving a variety of dyes in water or an organic solvent or a mixture thereof, but various more strict performances are required as compared with the ink for writing instruments such as a fountain pen and a ball-point pen, in various characteristics.

Further, as a recent trend, output by an inkjet printer is eagerly required to offer a high quality image (a sharp image having high optical density and no bleeding), high speed printing, and water resistance and light resistance of print.

Then, to realize high speed printing, rapid fixing of ink is required. Therefore, attempts were made to improve penetratability of ink into a recording medium. Japanese kokai publication 183761/1992, U.S. Pat. No. 5,156,675, U.S. Pat. No. 5,183,502 and the like, for example, disclose addition of diethylene glycol monobutyl ether, addition of both glycol ethers and a nonionic acetylene glycol surface active agent, and the like.

The permeable ink disclosed herein, however, when it is used for recording on the plain paper of which surface is not particularly treated (copy paper, report paper, bond paper, letter paper, postcard, sales slip and the like used in an office, school, home), gives poor colour development, since the ink permeate into the paper. Therefore, it was difficult to obtain a sharp image having high optical density. When the dye concentration is increased in order to solve this problem, reliability of the ink becomes poor and clogging may occur. Therefore, dyes used in permeable inks are required to have extremely high solubility.

On the other hand, for the requirement about water resistance of print, there offered a lot of ink having excellent water resistance, such as the aqueous ink containing a dye having a phosphoric group disclosed in Japanese kokoku publication 30956/1993, the ink containing a disazo dye having a carboxyl group and the like disclosed in Japanese kokai publication 91577/1991, Japanese kokai publication 262998/1993 and the like.

However, though the ink disclosed is excellent in water resistance, when used for recording on the acidic paper, pH of which surface is in an acidic range, a brownish image is obtained and density of the image becomes low, therefore, a high grade image can not be obtained. Further, there is a problem that clogging is prone to occur in fine discharge orifices of an inkjet head due to insufficient solubility of the dye in a liquid medium, therefore, the dyes are not appropriate for the permeable ink.

In addition, a variety of the ink compositions having excellent water resistance by using known dyes, have been made. However, there have not been provided the ink which suffice both enough water resistance and high grade image.

SUMMARY OF THE INVENTION

An object of the invention is to provide a dye composition and an ink composition which give high grade image (a sharp image having high optical density and no bleeding), rapid fixing of the ink, water resistance and light resistance, even when it is printed on the plain paper.

The present inventors have found that above-described high grade image and water resistance are simultaneously satisfied by using, as a recording agent of ink, a composition obtained by selecting two aqueous dyes having similar structures and excellent characteristics from among known black disazo dyes and mixing these dyes at a certain ratio, or a composition synthesized directly as a dye composition.

BRIEF DESCRIPTION OF THE DRAWINGS

The present invention will become more fully understood from the detailed description given hereinbelow and accompanying drawings which are given by way of illustration only, and wherein.

DETAILED DESCRIPTION OF THE INVENTION

Figure 1:
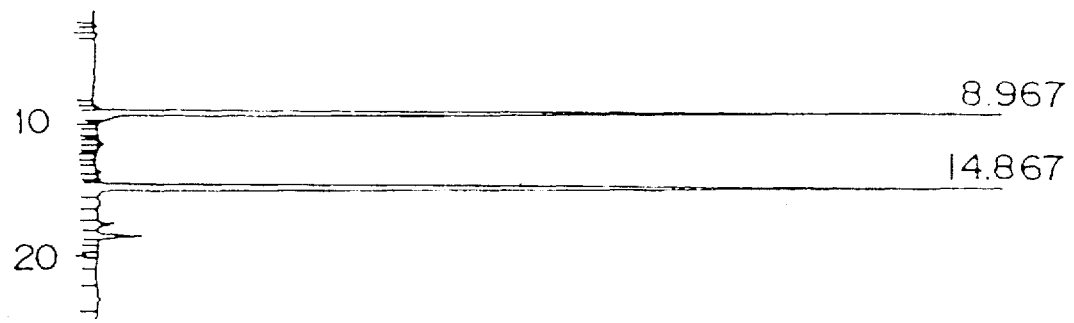
FIG. 1 is the chromatogram of the dye composition 1 obtained in Example 1.

The present invention relates to a disazo dye composition comprising at least a disazo dye represented by the formula (I) and a disazo dye represented by the formula (II):

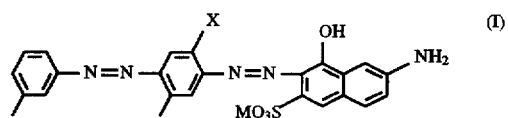

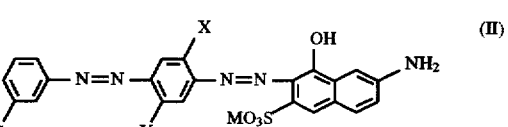

(wherein X and Y indicate an alkoxy group having 1 to 4 carbon atoms, and M indicates hydrogen or a cation selected from the group consisting of, alkaline metal, $NH_4$, alkyl-substituted ammonium, alkanolammonium, morpholinium, piperidinium and the like), wherein, when the disazo dye composition is analyzed by liquid chromatography, the area ratio of the peak area (Sp) of the disazo dye represented by the formula (I) to the peak area (Sc) of the disazo dye represented by the formula (II), that is Sp:Sc is from 1:0.4 to 1:2.4, preferably from 1:0.6 to 1:1.5, and an ink composition using the same.

As an alkoxy group represented by X, Y in the dyes represented by the above-mentioned formulae (I) and (II) used in the present invention, for example, a methoxy group, ethoxy group, propoxy group and butoxy group are listed. Alkoxy groups X and Y may be the same or different.

M is selected from hydrogen, alkaline metal, $NH_4$, alkyl-substituted ammonium, alkanolammonium, morpholinium, piperidinium and the like.

Specific examples of the disazo dye compounds employed in the present invention are listed below.

The followings are the dye compounds for the formula (I), however, these should not be construded as limiting the dye compounds represented by the formula (I).

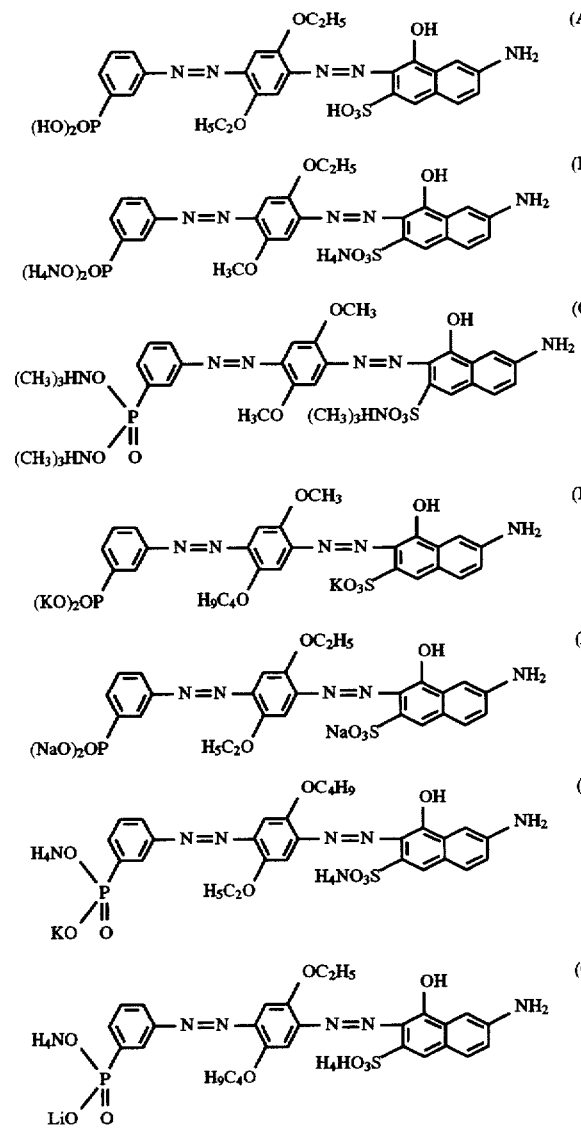

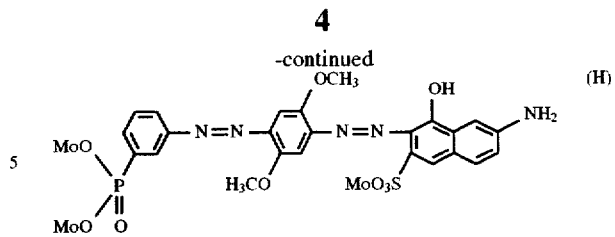

Mo represents morpholinium

The followings are the dye compounds for the formula (II), however, these should not be construed as limiting the dye compounds represented by the formula (II).

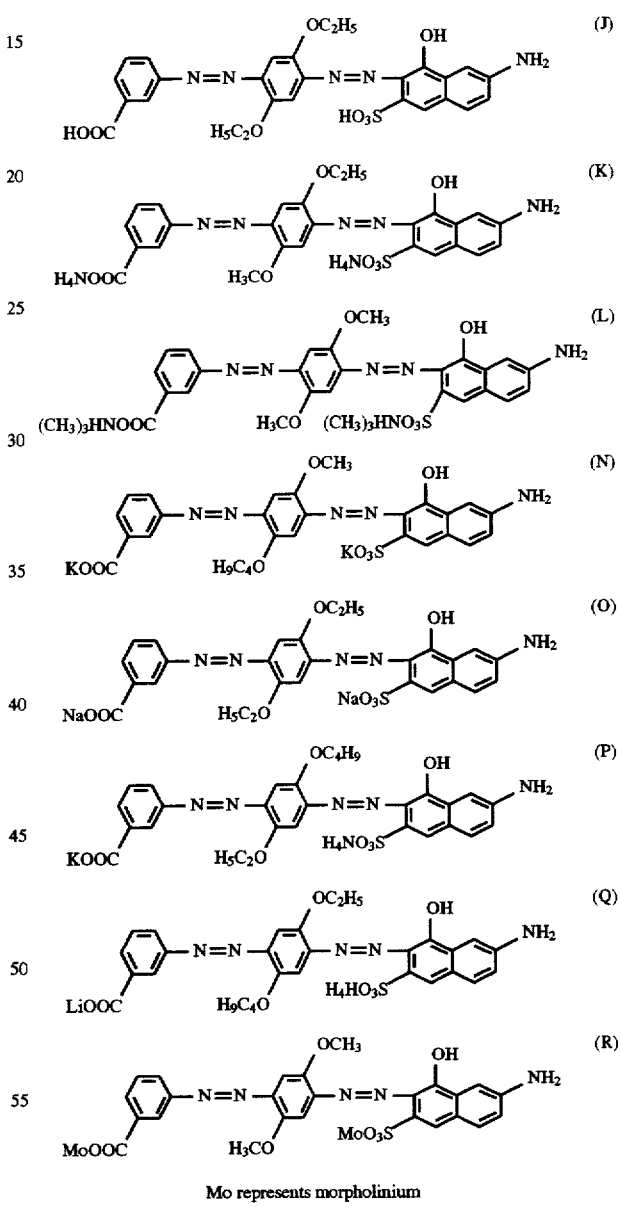

Mo represents morpholinium

In the formula (I) and (II), when M represents hydrogen, the water soluble acid group is in the form of free acid. Specifically, each of which represents a phosphoric acid group ($PO_3H_2$), carboxyl group (COOH), sulfonic acid group ($SO_3H$). When M represents a cation such as alkaline metal, $NH_4$, alkyl-substituted ammonium, alkanolammonium, or a nitrogen-containing cyclic compound (e.g., morpholinium and piperidinium), the acid group forms alkaline metal salt, ammonium salt, alkyl-substituted ammonium salt, alkanolamine salt, morpholinium salt, piperidinium salt and the like, and the dye compounds become soluble to water. In general, this kind of acidic dye is soluble in an aqueous medium mainly comprising water, which shows pH in a basic range. In this case, M may be the same or different.

Further, the present inventors found out that extremely excellent water resistance on paper is obtained when M forms alkaline salt with volatile bases such as $NH_4$, alkyl-substituted ammonium, alkanolammonium, morpholinium, piperidinium and the like. Examples of amine used for forming such salts include alkyl-substituted amines such as methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, dibutylamine, allylamine; alkanolamines such as ethanolamine, diethanolamine, triethanolamine, propanolamine, diethylethanolamine; nitrogen-containing cyclic compounds such as morpholine, piperidine; and a mixture thereof. However, the whole dye of the present invention does not have to be ammonium salt, alkyl-substituted ammonium salt, alkanolamine salt, morpholinium salt or piperidinium salt completely, and may be a mixture with alkaline metal salts. In such case, the proportion of the alkaline metal salts in whole dye is preferably not more than 50% by weight.

The disazo dye represented by the above-mentioned formula (I) is that having phosphoric group which is included in the dye group disclosed in Japanese kokoku publication 80956/1993. For synthesis of this dye, m-aminobenzenephosphonic acid is diazotized in a usual method, and it is coupled with 2,5-dialkoxy-substituted aniline having 1 to 4 carbon atoms to form a monoazo compound having an amino group. Thus obtained monoazo compound is isolated, or subsequently is diazotized in a usual way, and coupled with γ acid (2-amino-8-naphthol-6-sulfonic acid) to easily obtain the dye in high yield and high purity.

Also, the disazo dye represented by the above-mentioned formula (I) has excellent dyeing ability on cellulose fibers such as paper and shows excellent water resistance, because the dye has a phosphoric group in dye structure. Further, since the dye also has a water soluble acid group such as a sulfonic acid group at the same time, solubility in an aqueous liquid medium is excellent. The solubility in water of the dye differs depending on pH of the aqueous solvent, and it shows excellent solubility at pH of from 7.5 to 11, preferably from 8.5 to 10 and the solubility becomes poor at pH in an acidic range.

However, if the ink for inkjet recording is prepared using such disazo dye alone, optical density of an image is insufficient. There is also a problem regarding solution stability of the dye that a clogging may occur when dye concentration is increased in order to improve the optical density.

The disazo dye represented by the above-mentioned formula (II) is that having carboxyl group which is disclosed in Japanese kokai publication 262998/1993 or Japanese kokai publication 125318/1993. For synthesis of this dye, m-aminobenzenecarboxylic acid is diazotized in a usual method, and it is coupled with 2,5-dialkoxy-substituted aniline having 1 to 4 carbon atoms to form a monoazo compound having an amino group. Thus obtained monoazo compound is isolated, or subsequently is diazotized in a usual way, and coupled with γ acid (2-amino-8-naphthol-6-sulfonic acid) to easily obtain the dye in high yield and high purity.

Also, the disazo dye represented by the above-mentioned formula (II) has excellent water resistance, because the dye has a carboxyl group in dye structure. Further, since the dye also has a water soluble acid group such as a sulfonic acid group at the same time, the dye is dissolved in an aqueous liquid medium in the form of alkaline metal salt or ammonium salt. Since the dye is insoluble at pH of not more than 6, pH of from 8.0 to 10 is preferable.

However, if the ink for inkjet recording is prepared using such disazo dye alone, optical density of an image is insufficient. There is also a problem regarding solution stability of the dye that a clogging may occur when dye concentration is increased in order to improve the optical density.

It has been found that, however, by mixing the disazo dye represented by the formula (I) and the disazo dye represented by the formula (II) at a certain ratio, solubility of a mixture of these dyes remarkably increases. Owing to this discovery, both high grade image (a sharp image having a high optical density and no bleeding) and high reliability have been realized, even if it is printed on the plain paper. Further, because of water resistance and light resistance of the dyes themselves, the objects of the present invention have been solved.

The dye composition of the present invention essentially comprises the disazo dye represented by the formula (I) and the disazo dye represented by the formula (II), and when the dye composition is analyzed by liquid chromatography, the area ratio of the peak area (Sp) of the disazo dye represented by the formula (I) to the peak area (Sc) of the disazo dye represented by the formula (II), that is Sp:Sc is from 1:0.4 to 1:2.4, preferably from 1:0.6 to 1:1.5.

Especially when the ink for inkjet recording is produced, workability of ink production is considered, and a dense liquid having an ink concentration of not less than 10% by weight is often used. When the area ratio of Sc to Sp is not more than 0.4, the dye represented by the formula (I) deposits to cause a problem regarding solution storage stability. And when the area ratio of Sc to Sp is not less than 2.4, the dye represented by the formula (II) deposits to cause a problem regarding solution storage stability.

It has been found that the area ratio Sp:Sc at which the dye composition of the present invention shows excellent solution storage stability in a basic aqueous liquid medium is in the range of from 1:0.6 to 1:1.5.

The peak area ratio Sp:Sc in the present invention is the ratio of the area Sp of the peak portion indicating the disazo dye represented by the formula (I) to the area Sc of the peak portion indicating the disazo dye represented by the formula (II) observed in (high performance) liquid chromatography analysis. The conditions for the analysis are as follows.

Column

Packing: ODS (L-column)

Size: 4.6×250 mm

Elution Solution

A: 10% $CH_3CN$ aqueous solution containing 0.02N $KH_2PO_4$

B: 70% $CH_3CN$ aqueous solution

Measurement

Flow rate: 1.2 ml/min

Pressure: ca 120 $Kgf/cm^2$

Temperature: 45° C.

Detecting wavelength: 313 nm

Figure 12:
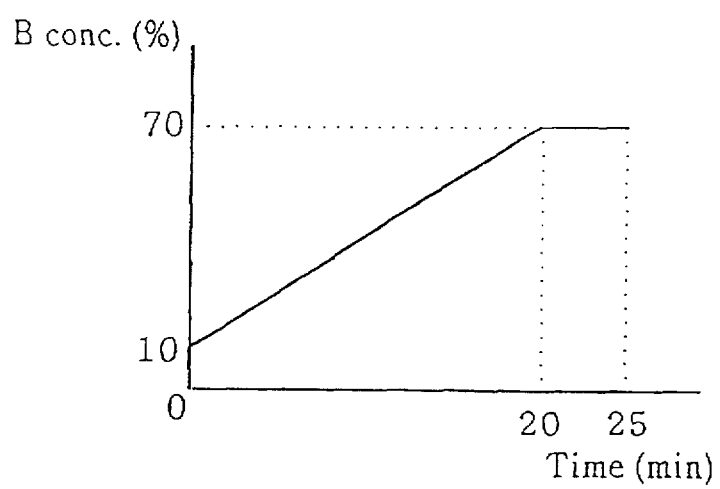
FIG. 12 is the graph which illustrates the gradient condition of the liquid chromatography.

Gradient (See FIG. 12)

Initial concentration of solution B: 10%

Final concentration of solution B: 70%

Gradient time: 20 min
(After that, elution is conducted at the same concentration for 5 min.)

Further, when the dye composition of the present invention is analyzed by the liquid chromatography using a detecting wavelength of 313 mm, the sum (Sp+Sc) of the peak areas of the disazo dye represented by the above-mentioned formula (I) and the disazo dye represented by the above-mentioned formula (II) is not less than 90%, preferably is not less than 95% of the sum of all the peak areas. If the sum (Sp+Sc) of the peak areas is not more than 90%, the object of the present invention may not be attained.

To produce the dye composition of the present invention which suffice the above-mentioned dye solution characteristic (solution storage stability), the above-mentioned disazo dye represented by the formula (I) and the above-mentioned disazo dye represented by the formula (II) may be individually synthesized and mixed. However, in order to simplify the synthetic process of the dyes, the simultaneous diazotization reaction of the mixed amine comprising m-aminobenzenephosphonic acid ① and m-aminobenzenecarboxylic acid ②, and successively, the coupling reaction with 2,5-dialkoxy-substituted aniline ③ used as the first coupler can, preferably be conducted, in usual methods. Regarding reaction conditions, it is preferable to diazotize at a temperature of from 0° to 5° C. and to couple at a temperature of from 0° to 5° C. and pH of from 0.5 to 3.5. The diazotization of the above-mentioned monoazo compound ④ and the coupling reaction with γ acid ⑤ (2-amino-8-naphthol-6-sulfonic acid) used as the second coupler are not particularly limited, and can be conducted in usual ways. Regarding reaction conditions, it is preferable to diazotize at a temperature of from 25° to 35° C. and to couple at a temperature of from 5° to 15° C. and pH of from 9 to 10.

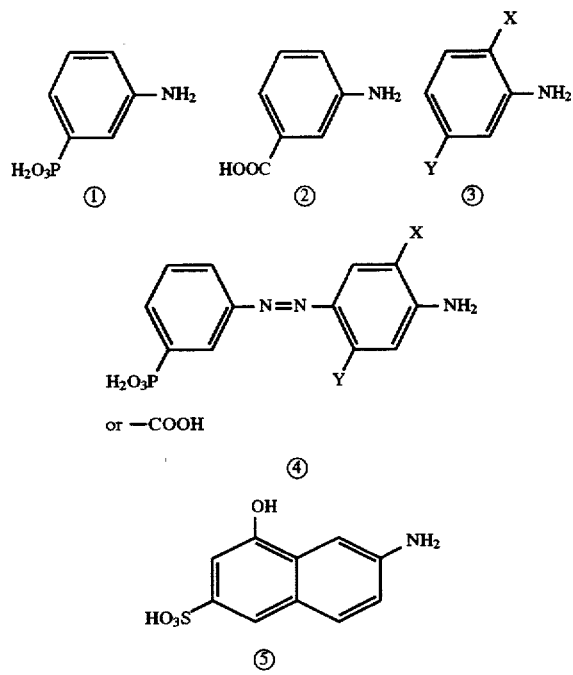

The dye concentrated liquid of the present invention comprises the above-mentioned disazo dye composition or the dye mixture comprising the above-mentioned disazo dye represented by the formula (I) and the above-mentioned disazo dye represented by the formula (II) in a mixing ratio of from 1:0.4 to 1:2.4, preferably from 1:0.6 to 1:1.5 and an aqueous medium mainly comprising water, and has a dye concentration of not less than 10% by weight.

The ink composition of the present invention comprises at least the disazo dye represented by the formula (I) and the disazo dye represented by the formula (II), and their mixing ratio is from 1:0.4 to 1:2.4, preferably from 1:0.6 to 1:1.5 in terms of the area ratio Sp:Sc (Sp indicates a peak area of the formula (I) and Sc indicates a peak area of the formula (II)) in liquid chromatography analysis. Therefore, solution stability of the ink composition is extremely improved, and, both high optical density of an image and high reliability with respect to clogging and the like can be achieved.

The dyes represented by the formulae (I) and (II) of the present invention, either alone or in the form of a dye composition mixed at a ratio defined in the present invention, provide excellent water resistance and colour development and improved solution storage stability and the like, by combining with a nitrogen-containing cyclic compound.

As the nitrogen-containing cyclic compound, 1,3-dimethyl-2-imidazolidinone, 2-pyrrolidone, N-methyl-2-pyrrolidone, ε-caprolactam and the like are listed, and they are used alone or in combination of more than one. These solvents have functions as a colour development aid and a water resistance aid, as well as they improve solution stability and printing stability of the dye. They are particularly preferred solvents for the ink composition of the present invention. The amount of addition is from 1 to 30% by weight, preferably from 3 to 20% by weight.

If the amount of addition is less than 1% by weight, above-mentioned functions can not be manifested, and more than 30% by weight, bleeding and deterioration in quality of the image may occur, these phenomena being unpreferable.

However, these nitrogen-containing cyclic compounds are poor in moisture retention ability, namely wettability. Therefore, when these nitrogen-containing cyclic compounds are used alone as the aid of the solution stability, clogging is apt to occur, and once clogging occurs, it is difficult to recover. Then, it is preferred that an anti-clogging agent (humectant) is used in combination. As the anti-clogging agent (humectant), polyhydric alcohols are preferred. Meanwhile, if the polyhydric alcohols are used alone as the aid of the solution stability, water resistance of the ink becomes poor and colour development characteristic becomes inferior. Therefore, it is particularly preferred that the dye represented by the general formulae (I) and (II), polyhydric alcohols and a nitrogen-containing cyclic compound are combined in the ink composition of the present invention.

As the polyhydric alcohols, ethylene glycol, diethylene glycol, triethylene glycol, polyethylene glycol, propylene glycol, 1,3-propanediol, 1,5-pentanediol, 1,2,6-hexanetriol, glycerin and the like are listed, and they are used alone or in combination of more than one. The amount of addition is from 1 to 30% by weight, preferably from 3 to 20% by weight.

If the amount of addition is less than 1% by weight, clogging occurs which is difficult to recover, and more than 30% by weight, drying time of an image lowers and quality of the image deteriorates, these phenomena being unpreferable.

There is large difference in solution storage stability of the ink, between the case in which the dyes of the formulae (I) and (II) are respectively used alone and the case in which they are mixed, and it is not preferred to use the dyes of the formulae (I) and (II) respectively alone in order to secure the reliability of the ink.

It is preferred that the ink composition of the present invention contains a nonionic acetylene glycol surface active agent. The additive is effective in keeping roundness of one dot of the discharged ink, as well as it gives fast penetration of the ink.

Specific nonionic acetylene glycol surface active agent used in the present invention includes, for example, SURFINOL 465, SURFINOL 104, OLFIN STG (they are all trade names of the products available from Nisshin Chemical Corp.) and the like, and the particularly preferred is OLFIN STG. The amount of addition is from 0.05 to 3% by weight, preferably from 0.5 to 2% by weight. If the amount of addition is less than 0.05% by weight, sufficient penetratability can not be obtained, and more than 30% by weight, bleeding occurs in an image and quality of the image deteriorates, these phenomena being unpreferable.

Further, by addition of glycol ethers in addition to the nonionic acetylene glycol surface active agent, the penetration further increases, and therefore, bleeding through the boundary of adjacent color ink when colour printing is conducted, decreases, and a very sharp image can be obtained.

Examples of glycol ethers of the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, triethylene glycol monobutyl ether and the like. The amount of addition is from 3 to 30% by weight, preferably from 5 to 15% by weight. If the amount of addition is less than 3% by weight, effect of anti-bleeding can not be obtained. And more than 30% by weight, bleeding of an image may occur. Furthermore, oily separation of the ink may occur, and a solution aid such as the glycol ether is required, consequently viscosity of the ink increase, and discharge by the inkjet head becomes difficult.

The ink composition of the present invention may be, if necessary, added with lower alcohols, pH regulators such as triethanolamine, alkaline metal hydroxide and the like, water soluble polymers such as sodium alginate and the like, water soluble resin, fluorine containing surface active agent, anti-fungal agent, anticorrosion agent and the like.

The ink production using the above-mentioned ink composition can be conducted according to a usual method. For example, there is a method in which each ingredient is fully mixed and dissolved, after pressure filtration through a membrane filter having a pore diameter of 0.8 μm, deaeration treatment using a vacuum pump to prepare the ink composition.

Next, the recording method of the present invention using the above-mentioned ink is explained. The preferred recording method is the inkjet recording method in which the ink is discharged through fine orifices as droplets. But, the ink composition of the present invention can be applied for general writing instruments, recorder, penplotter and the like.

As the inkjet recording method, any known methods can be used, especially, excellent image recording is provided in a method in which liquid droplets are discharged by using vibration of a piezoelectric element or by using heat energy.

The dye composition of the present invention comprises two disazo dye components having similar structures in the well-balanced mixing ratio.

Therefore, the dye composition and the ink composition which give high grade image (a sharp image having high optical density and no bleeding), rapid fixing of the ink, water resistance and light resistance, is provided.

Further, with the dye composition of the present invention, high quality recording is possible and water resistance of a recorded image can be obtained, especially on the plain paper such as copy paper, report paper, bond paper, letter paper, postcard, sales slip and the like used in an office, school or home.

EXAMPLE

The present invention will be further explained in detail in the following examples and comparative examples, but they are not construed as limiting the present invention.

First, the method for producing the ink composition of the present invention is explained in the following examples 1 to 5 and comparative examples 1 and 2.

Example 1

A mixed amine of 17.5 g (0.1 mol) of m-aminobenzenephosphonic acid and 13.85 g (0.1 mol) of m-aminobenzenecarboxylic acid was suspended in 400 ml of water under stirring, to this was added 30.4 g (0.29 mol) of 35% hydrochloric acid, and the resulting solution was cooled to 0° C. To this solution was added 40.0 g (0.21 mol) of 36% sodium nitrite aqueous solution gradually so that the temperature does not exceed 5° C., and the obtained solution was stirred for 50 minutes to diazotize the mixed amine, subsequently thiourea was added to the resulted aqueous solution, and excessive nitrous acid was removed to obtain a diazo-component containing liquid. Separately, 36.3 g (0.22 mol) of 2,5-diethoxyaniline was dispersed in 500 ml of water, and 21.3 g (0.21 mol) of 35% hydrochloric acid was added to dissolve the aniline to obtain a coupling-component containing liquid. Here, the coupling-component containing liquid was cooled to 0° C., to this was added above-mentioned diazo-component containing liquid dropwise so that the temperature does not exceed 5° C. Subsequently, the resulting mixture was stirred for 20 hours at 3° to 5° C. to obtain a monoazo compound (mixture), m-(2,5-diethoxy-4-amino-phenylazo)benzenephosphonic acid and m-(2,5-diethoxy-4-phenylazo)benzenecarboxylic acid.

The resulted monoazo compound mixture was dispersed in 900 ml of water, and 43.0 g (0.48 mol) of 45% sodium hydroxide aqueous solution was added to make a solution. To this solution was added 38.5 g (0.20 mol) of 36% sodium nitrite aqueous solution and cooled to 25° C., after further gradual addition of 130 g (0.71 mol) of 20% hydrochloric acid so that the temperature does not exceed 30° C., the resulting mixture was stirred for 3 hours at 25° to 30° C. to diazotize the monoazo compound mixture. Then, to the resulted aqueous solution was added sulfamic acid, and excessive nitrous acid was removed to obtain a diazo-component liquid.

Separately, 51.6 g (0.21 mol) of γ acid was added to 600 ml of water, and 37.0 g (0.42 mol) of 45% sodium hydroxide aqueous solution was added to make a solution, and the solution was cooled to prepare a coupler solution. To this, the previously prepared diazo-component containing liquid of the monoazo compound was added dropwise so that the reaction temperature does not exceed 8° C. and reaction pH is kept not less than 8.5 by the addition of 20% sodium hydroxide aqueous solution, then the mixture was stirred for 3 hours at 8° C. By salt/acid deposition treatment, about 75 g of a dye composition 1 mainly comprising the above-mentioned two disazo dyes represented by (A) and (J) was obtained.

When the resulted dye composition 1 was analyzed by high performance liquid chromatography (HPLC). The area ratio Sp:Sc of the disazo dye (A) to the disazo dye (J) was 50.4:49.6 (1:0.98). This chromatogram is shown in FIG. 1. And the sum of the peak areas (Sp+Sc) of the resulted disazo dyes was about 99% of the total area when a detecting wavelength is 313 nm.

The liquid chromatography analysis was conducted according to the above described conditions, by using the following apparatuses.

Contoroller: SCL-6A
Detector: SPD-6AV
Pump unit: LC-6A (x2)
Column oven: CTO-6A
Plotter: C-R6A The peak area ratio Sp/Sc of the disazo dyes represented by the formulae (I) and (II) was calculated based on the peak area analyzed by the plotter. The following are the parameters for analysis of the plotter.

| WIDTH: | 5 | SLOPE: | 330 |
|---|---|---|---|
| DRIFT: | 0 | MIN. AREA: | 4000 |
| T. DBL: | 5 | STOP TIME: | 25 |
| ATTEN: | 6 | SPEED: | 2 |

The sample was prepared by dissolving 3 mg of the dye composition (ammonium salt) into 50 ml of a carrier liquid.

Figure 2:
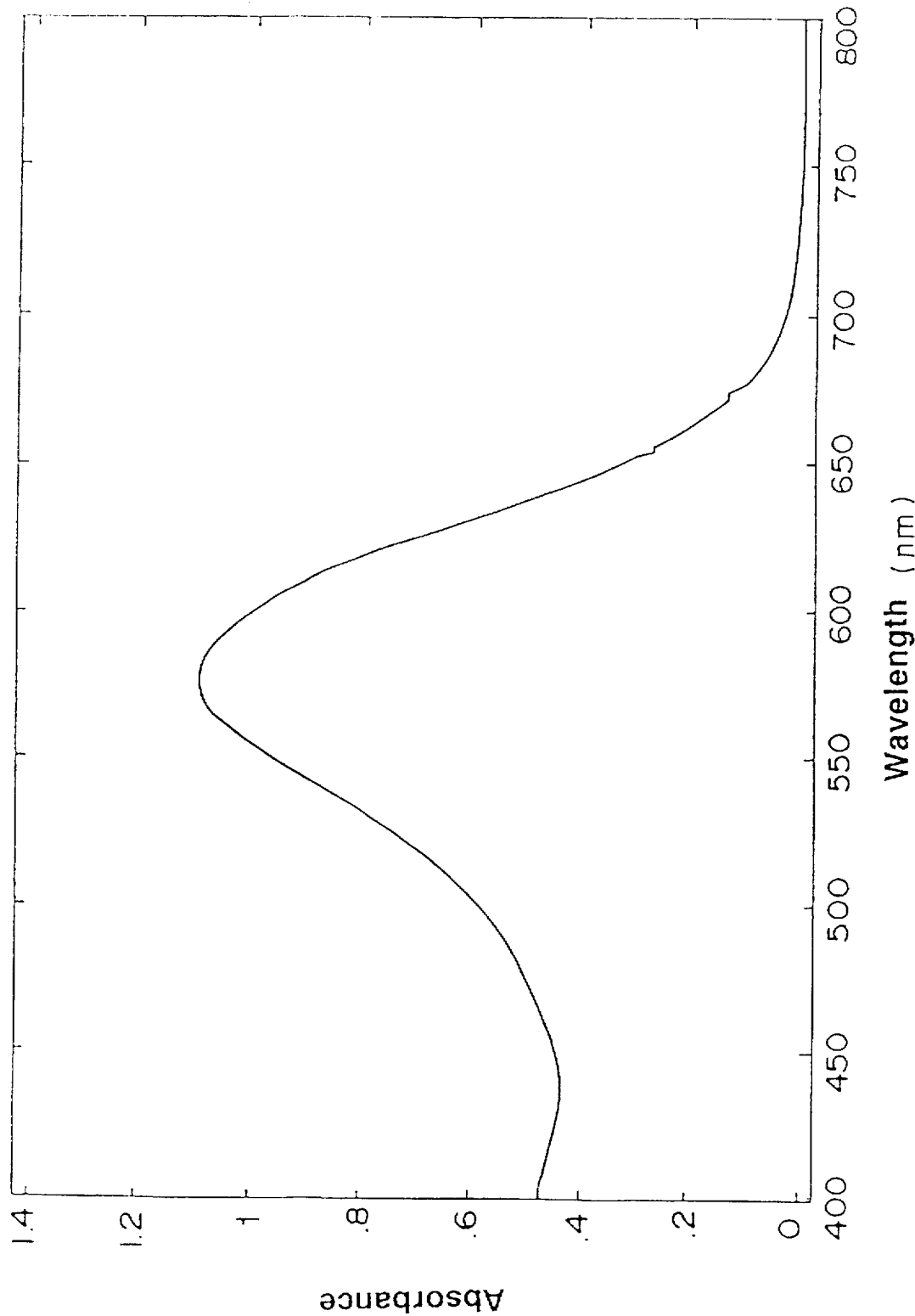
FIG. 2 is the visual light spectrum of the dye composition 1 obtained in Example 1.

And visual light absorption spectrum of the dye composition 1 was shown in FIG. 2.

Example 2

The same procedure as Example 1 was carried out, except that a mixed amine of 21.00 g (0.12 mol) of m-aminobenzenephosphonic acid and 11.08 g (0.08 mol) of m-aminobenzenecarboxylic acid was used instead of the mixed amine used in Example 1, to obtain about 76 g of dye composition 2 mainly comprising the above-mentioned two disazo dyes represented by the formulae (A) and (J).

Figure 3:
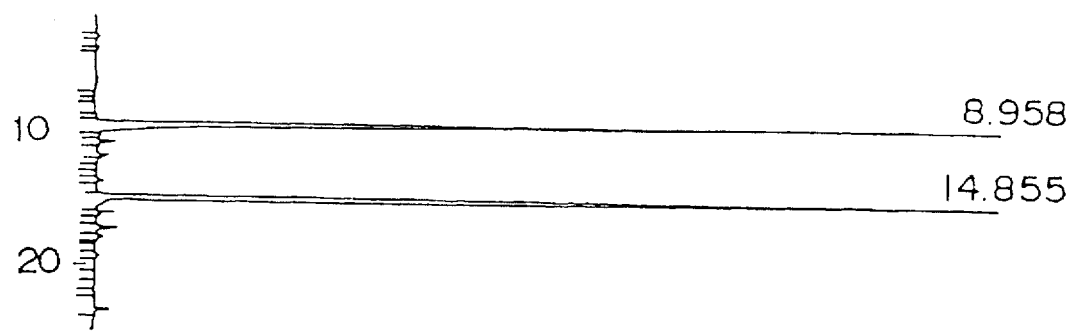
FIG. 3 is the chromatogram of the dye composition 2 obtained in Example 2.

When the resulted dye composition 2 was analyzed by high performance liquid chromatography, the area ratio Sp:Sc of the disazo dye (A) to the disazo dye (J) was 56.0:44.0 (1:0.79). This chromatogram is shown in FIG. 3. And the sum of the peak areas (Sp+Sc) of the resulted disazo dyes was about 99% of the total area when a detecting wavelength is 313 nm.

Example 3

The same procedure as Example 1 was carried out, except that a mixed amine of 14.00 g (0.08 mol) of m-aminobenzenephosphonic acid and 16.62 g (0.12 mol) of m-aminobenzenecarboxylic acid was used instead of the mixed amine used in Example 1, to obtain about 73 g of dye composition 3 mainly comprising the above-mentioned two disazo dyes represented by the formulae (A) and (J).

Figure 4:
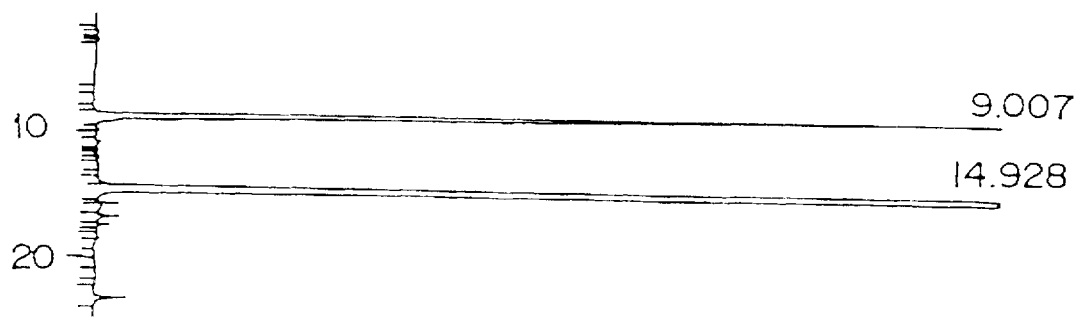
FIG. 4 is the chromatogram of the dye composition 3 obtained in Example 3.

When the resulted dye composition 3 was analyzed by high performance liquid chromatography, the area ratio Sp:Sc of the disazo dye (A) to the disazo dye (J) was 33.8:66.2 (1:1.96). This chromatogram is shown in FIG. 4.

And the sum of the peak areas (Sp+Sc) of the resulted disazo dyes was about 99% of the total area when a detecting wavelength is 313 nm.

Example 4

The same procedure as Example 1 was carried out, except that a mixed amine of 24.50 g (0.14 mol) of m-aminobenzenephosphonic acid and 8.31 g (0.06 mol) of m-aminobenzenecarboxylic acid was used instead of the mixed amine used in Example 1, to obtain about 77 g of dye composition 4 mainly comprising the above-mentioned two disazo dyes represented by the formulae (A) and (J).

Figure 5:
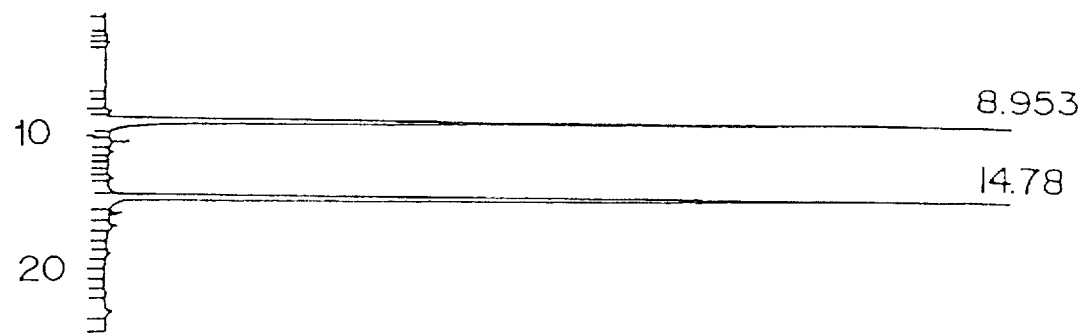
FIG. 5 is the chromatogram of the dye composition 4 obtained in Example 4.

When the resulted dye composition 4 was analyzed by high performance liquid chromatography, the area ratio Sp:Sc of the disazo dye (A) to the disazo dye (J) was 64.4:35.6 (1:0.55). This chromatogram is shown in FIG. 5. And the sum of the peak areas (Sp+Sc) of the resulted disazo dyes was about 99% of the total area when a detecting wavelength is 313 nm.

Example 5

The same procedure as Example 1 was carried out, except that a mixed amine of 10.50 g (0.06 mol) of m-aminobenzenephosphonic acid and 19.39 g (0.14 mol) of m-aminobenzenecarboxylic acid was used instead of the mixed amine used in Example 1, to obtain about 72 g of dye composition 5 mainly comprising the above-mentioned two disazo dyes represented by the formulae (A) and (J).

Figure 6:
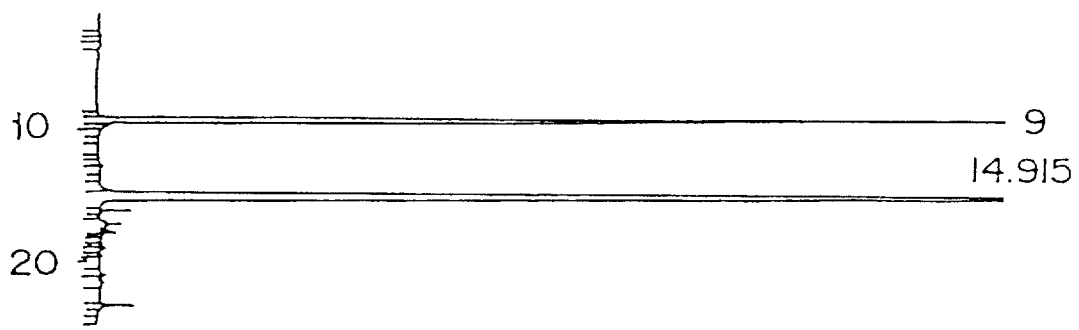
FIG. 6 is the chromatogram of the dye composition 5 obtained in Example 5.

When the resulted dye composition 5 was analyzed by high performance liquid chromatography, the area ratio Sp:Sc of the disazo dye (A) to the disazo dye (J) was 24.0:76.0 (1:3.17). This chromatogram is shown in FIG. 6. And the sum of the peak areas (Sp+Sc) of the resulted disazo dyes was about 99% of the total area when a detecting wavelength is 313 nm.

The above-mentioned examples are summarized and shown in Table 1.

TABLE 1

Synthesis of dye composition and analysis thereof by using high performance liquid chromatography

| Examples 1 to 5 | Diazo component mixed amine ① : ② (Reaction molar ratio) [① = m-H$_2$O$_3$P-C$_6$H$_4$-NH$_2$, ② = m-HOOC-C$_6$H$_4$-NH$_2$] | First coupler (2,5-diethoxyaniline) | Second coupler (1-hydroxy-6-amino-3-naphthalenesulfonic acid) | Peak area ratio HPLC detecting wavelength 313 nm Sp/Sc |
|---|---|---|---|---|
| 1 | ①:② = 0.5:0.5 (1.0) | 1 | 1 | 50.4/49.6 |
| 2 | ①:② = 0.6:0.4 (1.5) | 1 | 1 | 56.0/44.0 |
| 3 | ①:② = 0.4:0.6 (0.67) | 1 | 1 | 33.8/66.2 |
| 4 | ①:② = 0.7:0.3 (2.33) | 1 | 1 | 64.4/35.6 |
| 5 | ①:② = 0.3:0.7 (0.43) | 1 | 1 | 24.0/76.0 |

Next, synthesis of a disazo dye composition comprising either the above-mentioned disazo dye represented by the formula (I) or the above-mentioned disazo dye represented by the formula (II) included in the dye composition of the present invention, is explained below as comparative examples.

Comparative Example 1

The same procedure as Example 1 was carried out, except that 34.62 g (0.20 mol) of m-aminobenzenephosphonic acid was used instead of the mixed amine used in Example 1, to obtain about 80 g of the disazo dye represented by the above-mentioned formula (A).

Figure 7:
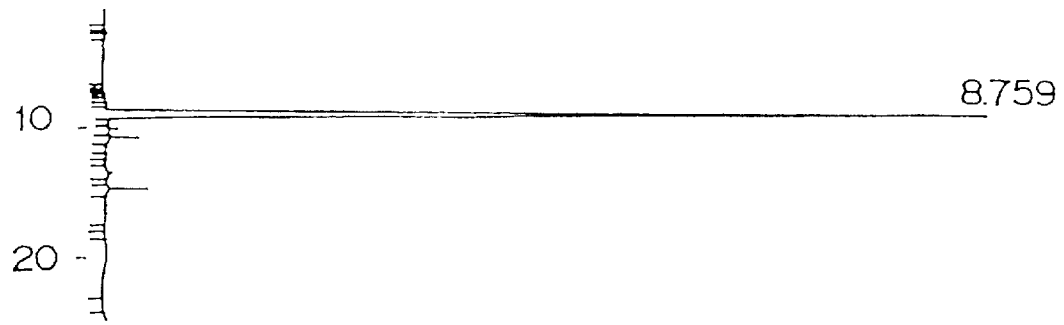
FIG. 7 is the chromatogram of the dye composition obtained in Comparative Example 1.

The resulted dye composition was analyzed by high performance liquid chromatography. This chromatogram is shown in FIG. 7.

Figure 8:
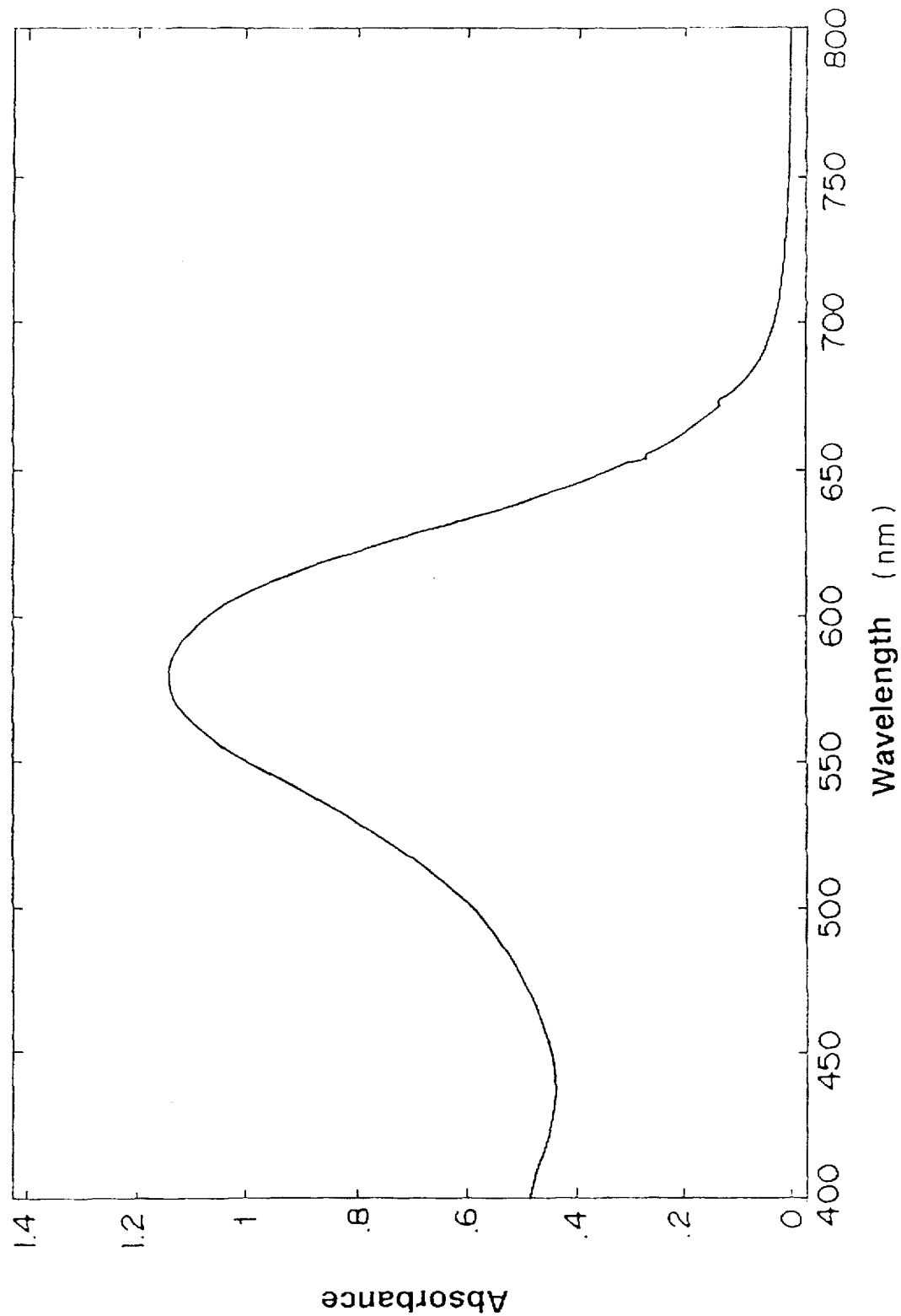
FIG. 8 is the visual light spectrum of the dye composition obtained in Comparative Example 1.

The visual light absorption spectrum of the disazo dye is shown in FIG. 8.

Comparative Example 2

The same procedure as Example 1 was carried out, except that 27.40 g (0.20 mol) of m-aminobenzenecarboxylic acid was used instead of the mixed amine used in Example 1, to obtain about 70 g of disazo dye represented by the above-mentioned formula (J).

Figure 9:
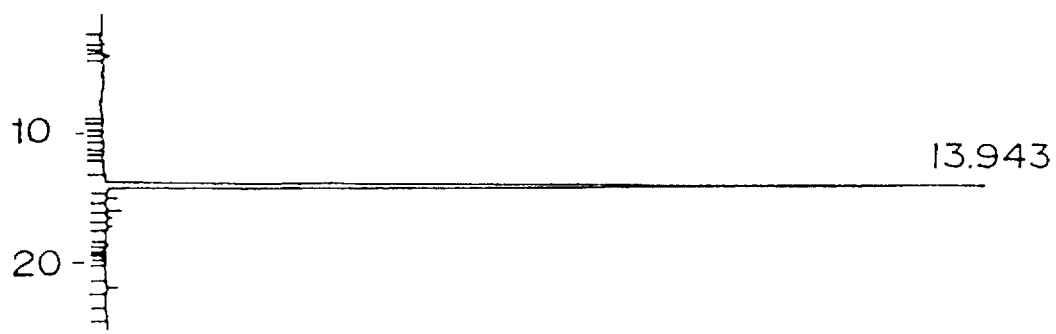
FIG. 9 is the chromatogram of the dye composition obtained in Comparative Example 2.

The resulted dye composition was analyzed by high performance liquid chromatography. This chromatogram is shown in FIG. 9.

Figure 10:
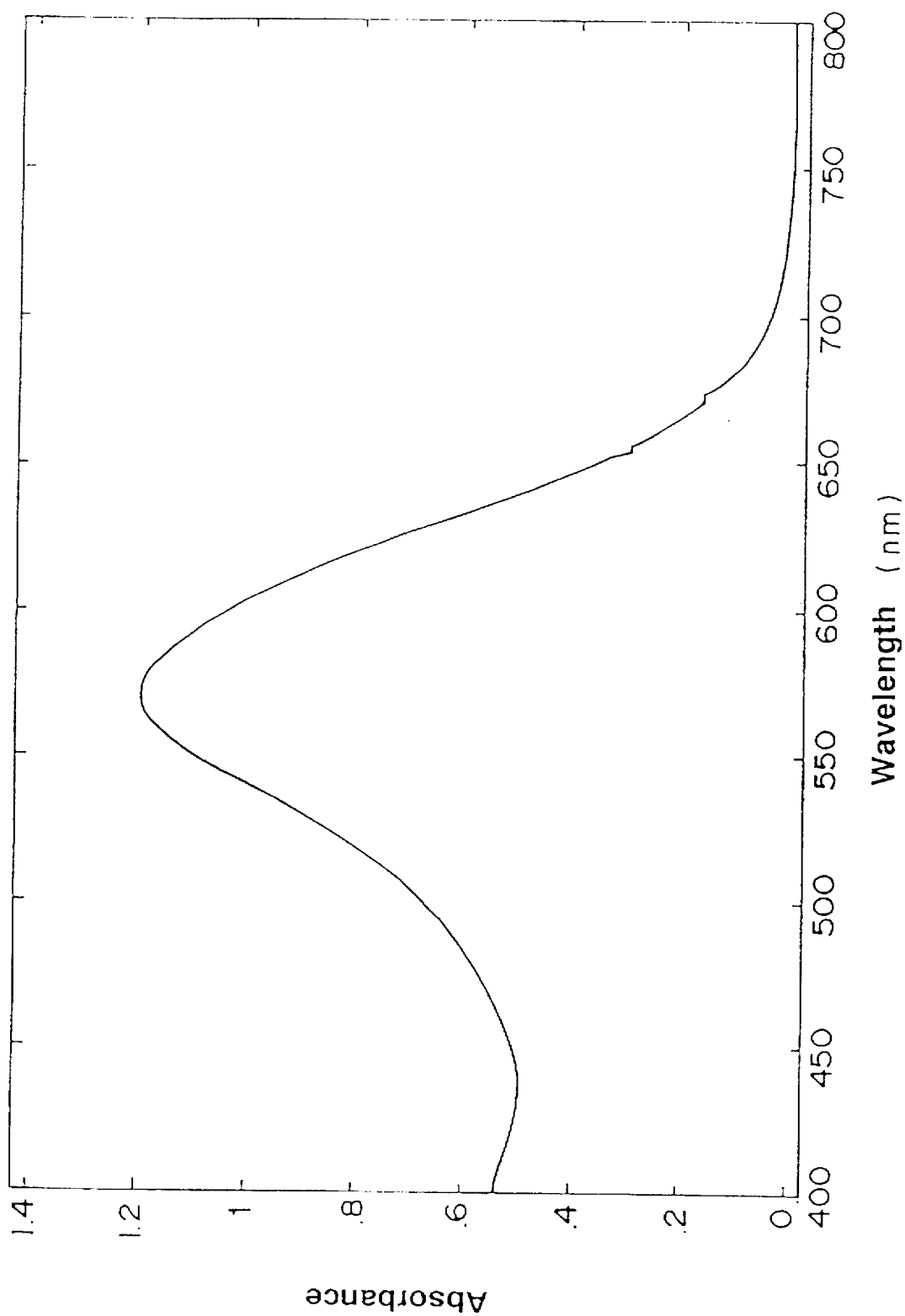
FIG. 10 is the visual light spectrum of the dye composition obtained in Comparative Example 2.
Figure 11:
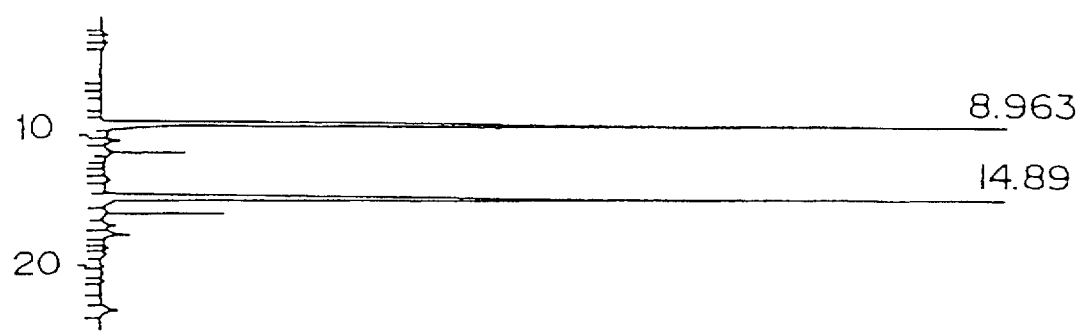
FIG. 11 is the chromatogram of the mixed dye concentrated liquid F obtained in Example 11.

The visual light absorption spectrum of the disazo dye is shown in FIG. 10.

Then, concentrated liquids having a dye concentration of not less than 10% by weight, comprising the dye composition of the present invention, are explained in the following Examples 6 to 10.

Example 6

A wet cake (dye content is about 25% by weight) before dry, obtained by the procedure of Example 1 was redispersed in ion exchanged water, this dispersion was purified and concentrated by using a reverse osmosis membrane (NTR-7410 made by Nitto Denko Corp.), and made into a dye concentrated liquid A comprising 15% by weight of the dye in the form of ammonium salt or sodium salt by using aqueous ammonia or aqueous sodium hydroxide.

The resulting dye concentrated liquid A was subjected to the following solution storage stability test of two months. The result is shown in Table 2.

<Method for solution storage stability test of dye concentrated liquid>

100 ml of the resulted dye concentrated liquid was charged into a heat resistant glass bottle, the glass bottle was sealed and allowed to stand for two months in an incubator set at 60° C. After that, the dye concentrated liquid was dropped on a filter paper to make a spot, and deposition of the dye was observed, and the result was evaluated as follows.

◎: no deposition of the dye is recognized at all.

○: slight deposition of the dye is recognized.

x: deposition of the dye is recognized.

Examples 7 to 10

The wet cakes before drying obtained according to the method of the above-mentioned Examples 2 to 5 were subjected to the same procedure as in Example 6 to obtain dye concentrated liquids each having a dye concentration and a counter ion shown in Table 2.

The resulted dye concentrated liquids B to E were subjected to the solution storage stability test of two months. The results are shown in Table 2.

Comparative Examples 3 to 4

The wet cakes before drying obtained according to the method of the above-mentioned Comparative Examples 1 to 2 were subjected to the same procedure as in Example 6 to obtain dye concentrated liquids each having a dye concentration and a counter ion shown in Table 2.

The resulted dye concentrated liquids "a" and "b" were subjected to the solution storage stability test of two months. The results are shown in Table 2.

Further, by using the above-mentioned dye example (A) obtained in the Comparative Example 1 and the above-mentioned dye example (J) obtained in the Comparative Example 2, the following mixed dye concentrated liquids each comprising 15% by weight of the dye in the form of ammonium salt were respectively prepared using ammonia water.

Example 11

Mixed dye concentrated liquid F; (A):(J)=5:5

Mixed dye concentrated liquid G; (A):(J)=6:4

Mixed dye concentrated liquid H; (A):(J)=4:6

Mixed dye concentrated liquid I; (A):(J)=7:3

Mixed dye concentrated liquid J; (A):(J)=3:7

The resulted dye concentrated liquids F to J and respective mixed dye concentrated liquid shown in Table 2 were subjected to the solution storage stability test of two months. The results are shown in Table 2.

TABLE 2

Solution storage stability test of dye concentrated liquid

| Example | Ammonium salt 12% | 14% | 15% | 16% | Na salt 13% | Dye of concentrated liquid |
|---|---|---|---|---|---|---|
| Example 6 | ◎ | ◎ | ◎A | ○ | ◎ | Dye composition 1 |
| Example 7 | ◎ | ◎ | ◎B | ○ | ◎ | Dye composition 2 |
| Example 8 | ◎ | ◎ | ○C | x | ◎ | Dye composition 3 |
| Example 9 | ◎D | ○ | ○ | x | ◎ | Dye composition 4 |
| Example 10 | xE | — | — | — | ○ | Dye composition 5 |
| Comparative Example 3 | x | — | xa | — | x | Disazo dye of Comparative Example 1 |
| Comparative Example 4 | x | — | xb | — | x | Disazo dye of Comparative Example 2 |
| Example 11 | ◎ | ◎ | ◎F | — | ◎ | Mixed dye f |
|  | ◎ | ◎ | ○G | — | ◎ | Mixed dye g |
|  | ◎ | ◎ | ○H | — | ◎ | Mixed dye h |
|  | ◎ | ○ | ○I | — | ○ | Mixed dye i |
|  | ◎ | ○ | ○J | — | ○ | Mixed dye j |

Examples 6 to 10; dye composition concentrated liquid

Comparative Example 3; concentrated liquid of disazo dye of Comparative Example 1

Comparative Example 4; concentrated liquid of disazo dye of Comparative Example 2

Example 11; concentrated liquid of mixed dyes f to j

Mixed dye f; disazo dye of Comparative Example 1: disazo dye of Comparative Example 2=5:5

Mixed dye g; disazo dye of Comparative Example 1: disazo dye of Comparative Example 2=6:4

Mixed dye h; disazo dye of Comparative Example 1: disazo dye of Comparative Example 2=4:6

Mixed dye i; disazo dye of Comparative Example 1: disazo dye of Comparative Example 2=7:3 mixed dye j; disazo dye of Comparative Example 1: disazo dye of Comparative Example 2=3:7

Next, the ink composition is explained concretely.

The ink compositions of Examples 12 to 20 and Comparative Examples 5 to 7 were prepared in mixing ratios shown in Table 3 according to the above-mentioned ink production method. Here, each ink component shown in the table is indicated in % by weight in total ink weight, and the residue is water.

to 20 and Comparative Examples 5 to 7, evaluations were made on the following Tests 1 to 5.

<Test 1: water resistance>

Alphabet letters were printed on (1) EPP paper (acid paper; available from Epson Sales Corp.) and (2) Xerox P (neutral paper; available from Fuji Xerox Corp.), and water

TABLE 3

| Ink composition | | Example 12 | Example 13 | Example 14 | Example 15 | Example 16 | Example 17 |
|---|---|---|---|---|---|---|---|
| Dye concentrated liquid | A | 16 (2.3) | | 40 (6.0) | | | |
| | B | | | | 50 (7.5) | | |
| | E | | | | | | 42 (5.0) |
| | a | | | | | | |
| | b | | | | | | |
| Mixed dye concentrated liquid | F | | | | | 50 (7.5) | |
| | G | | | | | | |
| | J | | 16 (2.3) | | | | |
| Diethylene glycol | | | | | 10 | 5 | |
| Polyethylene glycol A200 | | | 5 | | | 5 | |
| 1,5-pentane diol | | | | | | 5 | |
| Glycerin | | 5 | | 10 | | | 10 |
| 2-pyrrolidone | | 5 | | 5 | | 10 | 5 |
| 1,3-dimethyl-2-imidazolidinone | | | 3 | | 6 | | |
| Diethylene glycol monobutyl ether | | | | | | | |
| Triethylene glycol monobutyl ether | | | | | | | |
| Propylene glycol monobutyl ether | | | | | | | |
| Triethanolamine | | | | | 0.5 | | 0.5 |
| Potassium hydroxide | | | 0.1 | | | | |
| Ethanol | | 4 | | | | | |
| 1-propanol | | | 3 | | | | |
| Surfinol 465 | | | | | 1 | | |
| Olfin STG | | | | 1 | | 0.8 | 1 |
| Sodium alginate | | | 0.01 | | | | |
| Antifungal agent | | 0.3 | 0.3 | 0.3 | 0.3 | 0.3 | 0.3 |

Number in ( ) indicates solid component.

TABLE 4

| Ink composition | | Example 18 | Example 19 | Example 20 | Comparative Example 5 | Comparative Example 6 | Comparative Example 7 |
|---|---|---|---|---|---|---|---|
| Dye concentrated liquid | A | 40 (6.0) | | | | | 16 (2.3) |
| | B | | 50 (7.5) | | | | |
| | E | | | | | | |
| | a | | | | 40 (6.0) | | |
| | b | | | | | 40 (6.0) | |
| Mixed dye concentrated liquid | F | | | | | | |
| | G | | | 50 (7.5) | | | |
| | J | | | | | | |
| Diethylene glycol | | | 10 | 5 | | | |
| Polyethylene glycol A200 | | | | 5 | | | |
| 1,5-pentane diol | | | | 5 | | | |
| Glycerin | | 10 | | | 10 | 10 | 5 |
| 2-pyrrolidone | | 5 | | 10 | 5 | 5 | |
| 1,3-dimethyl-2-imidazolidinone | | | 8 | | | | |
| Diethylene glycol monobutyl ether | | 10 | | | 10 | 10 | |
| Triethylene glycol monobutyl ether | | | 10 | | | | |
| Propylene glycol monobutyl ether | | | | | | | |
| Triethanolamine | | 0.5 | | | 0.5 | 0.5 | |
| Potassium hydroxide | | | | | | | |
| Ethanol | | | | | | | 4 |
| 1-propanol | | | | | | | |
| Surfinol 465 | | | 1 | | | | |
| Olfin STG | | 1 | | 0.8 | 1 | 1 | |
| Sodium alginate | | | | | | | |
| Antifungal agent | | 0.3 | 0.3 | 0.3 | 0.3 | 0.3 | 0.3 |

Number in ( ) indicates solid component.

In evaluation tests, inkjet printer MJ-700V2/C (made by Seiko-Epson Corp.) was used. That is, a black ink cartridge for MJ-700V2/C was charged with each ink of Examples 12 was dropped on the printed letters and air-dried. The condition of the letters was visually observed, and evaluated as follows.

◎: no change as compared to the initial condition.
○: slight bleeding of dye, but letter is clearly legible.
△: despite bleeding, letter is legible.
x: letter is illegible due to bleeding.

<Test 2: image quality>
<2-1>
Alphabet letters and graphical pattern were printed on the following test papers, and they were evaluated as follows, by measurement of optical density (OD value) of solid part and visual observation.
(1) EPP paper (Epson Sales Corp.)
(2) Xerox P (Fuji Xerox Corp.)
(3) Xerox 4024 (Xerox Corp.)
(4) Ricopy 6200 (Ricoh Corp.)

Meanwhile, for measuring OD value, reflection density was measured by using Macbeth TR-927 (made by Macbeth Corp.).

◎: no bleeding and OD value is not less than 1.30.
○: slight bleeding is observed, but there is no influence on the image, and OD value is not less than 1.25.
△: a little bleeding, but OD value is less than 1.25.
x: OD value is less than 1.20.

<2—2>
Colour printing was conducted on the following papers, and bleeding into the neighboring colour ink was visually evaluated.
(1) EPP paper (Epson Sales Corp.)
(2) Xerox P (Fuji Xerox Corp.)
(3) Xerox 4024 (Xerox Corp.)
(4) Ricopy 6200 (Ricoh Corp.)

◎: no bleeding and clear
○: slight bleeding, but clear
△: relatively noticeable bleeding
x: intense bleeding <Test 3: clogging recovering ability>
After charging of an ink into a recording head of MJ-700V2/C, the recording head was allowed to stand for one month at 40° C., being shifted from the cap position. After that, cleaning times required to enable normal printing was counted and evaluated as follows.

◎: 0 to 2 times
○: 3 to 5 times
△: 5 to 10 times
x: can not recover by 10 times

<Test 4: printing stability>
Continuous printing was conducted using self check pattern loaded on MJ-700V2/C, and stable printing time was evaluated as follows.

◎: not less than 24 hours
○: not less than 10 hours and less than 24 hours
x: less than 10 hours <Test 5: storage stability>
The ink cartridge for MJ-700V2/C was charged with an ink, and allowed to stand for two weeks at −30° C. and 70° C., and before and after that time, physical property, colour tone change, extraneous material and deposit appearance of ink were observed and evaluated as follows.

○: no change in physical property and colour tone, and no appearance of extraneous material and deposit.
x: change in physical property or colour tone, or appearance of extraneous material or deposit.

Evaluation results of the above-mentioned tests 1 to 5 are shown in Table 5.

TABLE 5

| Test item | Ink | Example 12 | Example 13 | Example 14 | Example 15 | Example 16 | Example 17 |
|---|---|---|---|---|---|---|---|
| Test 1 Water resistance | (1) | ○ | ◎ | ○ | ○ | ○ | ◎ |
| | (2) | ○ | ○ | ○ | ○ | ○ | ○ |
| Test 2-1 Image quality | (1) | ◎ | ○ | ◎ | ◎ | ◎ | ◎ |
| | (2) | ◎ | ○ | ◎ | ◎ | ◎ | ◎ |
| | (3) | ◎ | ○ | ◎ | ◎ | ◎ | ◎ |
| | (4) | ◎ | ○ | ◎ | ◎ | ◎ | ◎ |
| Test 2-2 Bleeding | (1) | △ | △ | ○ | ○ | ○ | ○ |
| | (2) | △ | △ | ○ | ○ | ○ | ○ |
| | (3) | △ | △ | ○ | ○ | ○ | ○ |
| | (4) | △ | △ | ○ | ○ | ○ | ○ |
| Test 3 Clogging recovering ability | | ◎ | ○ | ◎ | ◎ | ○ | △ |
| Test 4 Printing stability | | ◎ | ◎ | ◎ | ◎ | ◎ | ○ |
| Test 5 Storage stability | | ○ | ○ | ○ | ○ | ○ | ○ |

| Test item | Ink | Example 18 | Example 19 | Example 20 | Comparative Example 5 | Comparative Example 6 | Comparative Example 7 |
|---|---|---|---|---|---|---|---|
| Test 1 Water resistance | (1) | ○ | ○ | ○ | ○ | ◎ | ○ |
| | (2) | ○ | ○ | ○ | ○ | ○ | ○ |
| Test 2-1 Image quality | (1) | ◎ | ◎ | ◎ | ○ | x | △ |
| | (2) | ◎ | ◎ | ◎ | ○ | x | △ |
| | (3) | ◎ | ◎ | ◎ | ○ | x | △ |
| | (4) | ◎ | ◎ | ◎ | ○ | x | △ |
| Test 2-2 Bleeding | (1) | ◎ | ◎ | ◎ | ◎ | ◎ | x |
| | (2) | ◎ | ◎ | ◎ | ◎ | ◎ | x |

TABLE 5-continued

| | | | | | | |
|---|---|---|---|---|---|---|
| (3) | ○ | ○ | ○ | ○ | ○ | x |
| (4) | ○ | ○ | ○ | ○ | ○ | x |
| Test 3 Clogging recovering ability | ○ | ○ | ○ | x | x | ⊙ |
| Test 4 Printing stability | ○ | ○ | ○ | x | x | ⊙ |
| Test 5 Storage stability | ⊙ | ⊙ | ⊙ | x | x | ⊙ |

What is claimed is:

1. A disazo dye composition comprising at least a disazo dye represented by the formula (I) and a disazo dye represented by the formula (II):

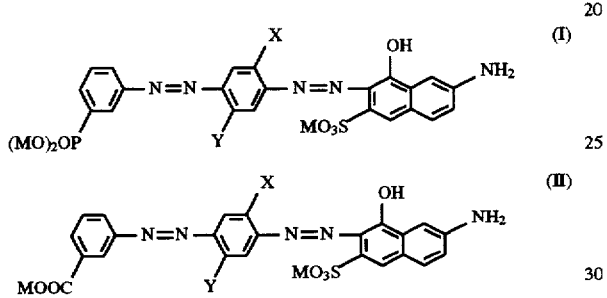

(wherein X and Y indicate an alkoxy group having 1 to 4 carbon atoms, and M indicates hydrogen or a cation selected from the group consisting of alkaline metal, $NH_4$, alkyl-substituted ammonium, alkanolammonium, morpholinium and piperidinium), wherein, when the disazo dye composition is analyzed by liquid chromatography, the area ratio of the peak area (Sp) of the disazo dye represented by the formula (I) to the peak area (Sc) of the disazo dye represented by the formula (II), that is Sp:Sc is from 1:0.4 to 1:2.4.

2. The disazo dye composition according to claim 1, wherein the area ratio Sp:Sc is from 1:0.6 to 1:1.5.

3. A method for producing the disazo dye composition of claim 1, comprising the steps of:

simultaneously diazotizing a mixed amine comprising m-aminobenzenephosphonic acid ① and m-aminobenzenecarboxylic acid ② in a molar ratio ①:② of from 1:0.4 to 1:2.5 and coupling with 2,5-dialkoxy-substituted aniline ③ to obtain a monoazo compound ④, and diazotizing thus obtained monoazo compound ④ and coupling with γ acid ⑤:

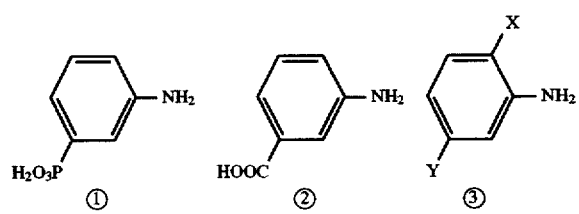

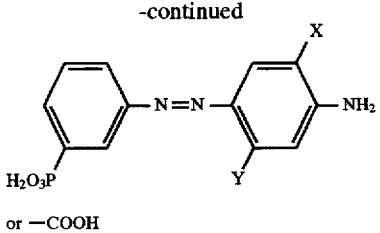

or —COOH

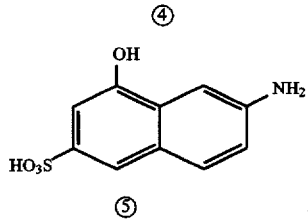

4. Dye concentrated liquid which comprises not less than 10% by weight of the disazo dye composition of claim 1.

5. A black aqueous ink composition comprising at least a disazo dye represented by the formula (I) and a disazo dye represented by the formula (II):

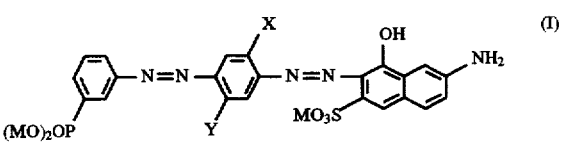

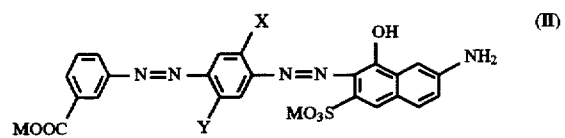

(wherein X and Y indicate an alkoxy group having 1 to 4 carbon atoms, and M indicates hydrogen or a cation selected from the group consisting of alkaline metal, $NH_4$, alkyl-substituted ammonium, alkanolammonium, morpholinium and piperidinium), wherein, when the black aqueous ink is analyzed by liquid chromatography, the area ratio of the peak area (Sp) of the disazo dye represented by the formula (I) to the peak area (Sc) of the disazo dye represented by the formula (II), that is Sp:Sc is from 1:0.4 to 1:2.4.

6. A black aqueous ink composition according to claim 5, wherein the area ratio Sp:Sc is from 1:0.6 to 1:1.5.

7. The black aqueous ink composition according to claim 5, which further comprises a polyhydric alcohol and a nitrogen-containing cyclic compound.

8. The black aqueous ink composition according to claim 5, which further comprises a nonionic acetylene glycol surface active agent.

9. The black aqueous ink composition according to claim 8, which further comprises glycol ethers.

10. An inkjet recording method in which the ink is discharged through fine orifices as droplets to record on a recording medium,
wherein the ink comprises at least a disazo dye represented by the formula (I) and a disazo dye represented by the formula (II):

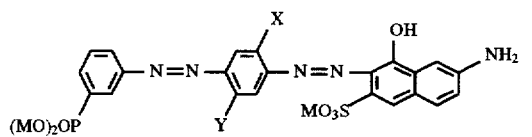
(I)

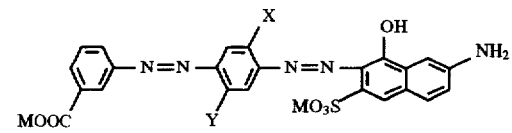
(II)

(wherein X and Y indicate an alkoxy group having 1 to 4 carbon atoms, and M indicates hydrogen or a cation selected from the group consisting of alkaline metal, $NH_4$, alkyl-substituted ammonium, alkanolammonium, morpholinium and piperidinium), and, when the ink is analyzed by liquid chromatography, the area ratio of the peak area (Sp) of the disazo dye represented by the formula (I) to the peak area (Sc) of the disazo dye represented by the formula (II), that is Sp:Sc is from 1:0.4 to 1:2.4.

11. The inkjet recording method according to claim 10, wherein the area ratio Sp:Sc is from 1:0.6 to 1:1.5.

12. The inkjet recording method according to claim 10, wherein the ink comprises a polyhydric alcohol, a nitrogen-containing cyclic compound, a nonionic acetylene glycol surface active agent, and a glycol ether, in addition to the disazo dyes represented by the formulae (I) and (II).

* * * * *